US008210551B2

(12) United States Patent
Jakob (10) Patent No.: US 8,210,551 B2
(45) Date of Patent: Jul. 3, 2012

(54) VEHICLE WHEEL SUSPENSION OF THE SEMI-TRAILER TYPE

(75) Inventor: Benjamin Jakob, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 13/287,667

(22) Filed: Nov. 2, 2011

(65) Prior Publication Data

US 2012/0068431 A1    Mar. 22, 2012

Related U.S. Application Data

(63) Continuation of application No. PCT/EP2010/001921, filed on Mar. 26, 2010.

(30) Foreign Application Priority Data

May 16, 2009    (DE) .................. 10 2009 021 672

(51) Int. Cl.
*B60G 3/14*    (2006.01)
*B60G 7/02*    (2006.01)

(52) U.S. Cl. ...... 280/124.13; 280/124.133; 280/124.116

(58) Field of Classification Search ........... 280/124.128, 280/124.129, 124.13, 124.131, 124.132, 280/124.133, 124.116, 5.52, 5.522, 5.523, 280/5.524; *B60G 3/12, 3/14, 3/18, 3/20, B60G 7/00, 7/02, 7/04*
See application file for complete search history.

(56) References Cited

U.S. PATENT DOCUMENTS

| | | | | |
|---|---|---|---|---|
| 2,129,232 A | * | 9/1938 | Paton | 180/360 |
| 3,229,783 A | * | 1/1966 | Muller | 180/359 |
| 3,893,701 A | | 7/1975 | Kroniger | |
| 4,203,615 A | * | 5/1980 | Cislo et al. | 280/124.106 |
| 4,715,615 A | * | 12/1987 | Kijima et al. | 280/124.133 |
| 4,758,018 A | * | 7/1988 | Takizawa et al. | 280/124.133 |
| 4,832,364 A | * | 5/1989 | Kikuchi et al. | 280/124.128 |
| 4,981,308 A | | 1/1991 | Kunert et al. | |

(Continued)

FOREIGN PATENT DOCUMENTS

DE    2 256 358    5/1974

(Continued)

OTHER PUBLICATIONS

German Search Report dated Mar. 1, 2010 including partial English-language translation (Nine (9) pages).

(Continued)

*Primary Examiner* — Paul N Dickson
*Assistant Examiner* — Keith Frisby
(74) *Attorney, Agent, or Firm* — Crowell & Moring LLP (57) ABSTRACT

In a vehicle wheel suspension, a first trailing arm is oriented in the longitudinal direction of the vehicle and a second trailing arm in the direction of an angle bisector between the longitudinal and transverse directions. The ends of the trailing arms determine a substantially horizontal instantaneous axis for the wheel carrier relative to the spring jounce and rebound motions of the vehicle chassis. The wheel carrier is slightly pivotable about a toe axis under the influence of braking forces. A support arm securely connects to the wheel carrier and extends over a defined distance substantially in parallel with and supported on the second trailing arm. The support is softer in the horizontal direction than in the vertical direction. A suitable design of the second trailing arm and/or the support arm allows a slight pivot motion of the wheel carrier about the toe axis.

12 Claims, 8 Drawing Sheets

U.S. PATENT DOCUMENTS

| | | | |
|---|---|---|---|
| 5,088,573 A * | 2/1992 | Moll | 180/415 |
| 5,829,764 A * | 11/1998 | Griffiths | 280/5.52 |
| 7,131,653 B2 * | 11/2006 | Asteggiano | 280/124.128 |

FOREIGN PATENT DOCUMENTS

| | | |
|---|---|---|
| DE | 28 22 058 A1 | 11/1979 |
| DE | 32 42 930 A1 | 5/1984 |
| DE | 32 42 930 C2 | 2/1989 |
| DE | 37 40 310 A1 | 6/1989 |
| DE | 39 00 336 C2 | 6/1996 |
| DE | 198 16 804 A1 | 11/1999 |
| DE | 102 49 445 A1 | 1/2004 |
| EP | 0 052 153 A1 | 5/1982 |
| JP | 2000-25434 A | 1/2000 |

OTHER PUBLICATIONS

International Search Report dated Jun. 4, 2010 including English-language translation (Six (6) pages).

* cited by examiner

VEHICLE WHEEL SUSPENSION OF THE SEMI-TRAILER TYPE

CROSS-REFERENCE TO RELATED APPLICATIONS

This application is a continuation of PCT International Application No. PCT/EP2010/001921, filed Mar. 26, 2010, which claims priority under 35 U.S.C. §119 from German Patent Application No. DE 10 1009 021 672.3, filed May 16, 2009, the entire disclosures of which are herein expressly incorporated by reference.

BACKGROUND AND SUMMARY OF THE INVENTION

The invention relates to a vehicle wheel suspension of the semi-trailer type with trailing arms, which extend from a wheel carrier. A first trailing arm is oriented approximately in the longitudinal direction of the vehicle, and a second trailing arm extends approximately in the direction of an angle bisector between the longitudinal direction of the vehicle and the transverse direction of the vehicle. The ends of the trailing arms that are supported on the vehicle chassis by means of trailing arm bearings determine a substantially horizontal instantaneous axis for the wheel carrier relative to the spring jounce and rebound motions of the vehicle chassis. Owing to the suitable design of at least one of the trailing arms and the suitable elastic design of at least one of the trailing arm bearings, the wheel carrier can be slightly pivoted about a so-called toe axis, in particular in the toe-in direction, under the influence of braking forces or lateral forces when driving through a curve, on the wheel that is on the outside in a curve and is mounted on the wheel carrier.

With respect to the prior art, reference is made, in particular, to DE 32 42 930 C1 and, furthermore, to EP 0 052 153, even though the latter document does not show a semi-trailer axle, but rather an especially elastic construction of an elastic trailing arm bearing at various spring rates in directions that are approximately perpendicular to each other.

The person skilled in the art knows that simple semi-trailer type wheel suspensions, which are used preferably at the driven rear axles of motor vehicles, have an undesired oversteer tendency in that the wheel that is on the outside in a curve toes out subject to the action of lateral forces. A number of remedial measures to counteract this problem have already been proposed (cf., for example, DE 39 00 336 C2, DE 102 49 44 5A1, DE 32 42 930 C1). When braking or cornering, these strategies allow the wheel that is on the outside in a curve to be pivoted in the toe-in direction under the influence of lateral forces. Yet even those prior art strategies that do not exhibit any notable disadvantages from the viewpoint of driving dynamics have not gained acceptance. Hence, it has not been possible to achieve adequate stability, subject to reasonable engineering, with a wheel suspension according to DE 32 42 930 C1, which appears to have kinematic advantages and is deemed to be the closest prior art.

Based on this prior art, there is needed a kinematically advantageous wheel suspension that can also satisfy the additional demands of being put into large scale production, in particular for passenger vehicles.

This and other needs are met according to the invention by providing a support arm that is securely connected to the wheel carrier and extends over a defined distance next to the second trailing arm substantially parallel to the same, and is supported on this second trailing arm in the area between its wheel carrier sided end and the vehicle chassis sided end by way of a support The support is much softer in the substantially horizontal direction than in the substantially vertical direction. A suitable design of the second trailing arm and/or the support arm allows a slight pivot motion of the wheel carrier about the toe axis. To this end, there are a plethora of options for designing or developing the second trailing arm in such a way. One possibility of a suitable design for the second trailing arm and/or the support arm consists of configuring at least one of these two trailing arms in the manner of a so-called control blade arm so as to be rigid in the vertical direction and substantially in the transverse direction of the vehicle and so as to be elastically deformable in the horizontal plane in the longitudinal direction of the vehicle.

An alternative possibility that shall be explained in detail below in the form of an embodiment consists of a second trailing arm being an independent component that can, therefore, be separated from the wheel carrier. One end of the second trailing arm or component is connected in an articulated manner to the wheel carrier, in order to represent the toe axis.

Both the support arm proposed herein and the second trailing arm can be designed in a simple way so that they can permanently absorb the forces that are to be transmitted and that predominantly involve the lateral forces acting on the wheel. The same applies to the bearings or joints, by which the second trailing arm is ultimately connected to the vehicle chassis. Similarly, the wheel carrier with the first trailing arm can be easily designed so that it satisfies all of the requirements without having to pay particular attention to the desired pivot motion in the toe-in direction when designing the wheel carrier, for example, with respect to stability. In other words, the engineering object is achieved by using, instead of the past conventional simple semi-trailer, a semi-trailer that is formed from two components that can be slightly pivoted in relation to each other about the toe axis essentially in the horizontal plane. In this case the second trailing arm and the support arm, which is also integrally connected, like the first trailing arm, to the wheel carrier, extend preferably over a defined distance essentially parallel next to each other. The latter guarantees in an advantageous way optimal wheel guidance, especially under the influence of lateral forces. At the same time the second trailing arm can also be connected in one piece to the wheel carrier. However, this second trailing arm then has to exhibit adequate flexibility in order to produce the desired pivotability of the wheel carrier. As an alternative, the second trailing arm may be an independent component that is mounted in a slightly pivotable manner on the wheel carrier in the vicinity of the wheel.

Moreover, the trailing arm bearing of the first trailing arm is constructed in a manner analogous to that of the prior art mentioned above, that is, relatively rigid in a direction, which extends essentially in the longitudinal direction of the vehicle, and relatively soft in a direction that is perpendicular thereto, in order to allow a toe change of the wheel under the influence of lateral forces.

The support between the support arm and the second trailing arm is designed preferably in such a way that the wheel that is on the outside in a curve is pivoted in the toe-in direction under the influence of lateral forces and under the influence of braking forces in the straightline travel of each wheel. This feature is achieved, on the one hand, by a support, which is relatively soft in the substantially horizontal direction and exhibits a preset elasticity that is different in different directions. In contrast, this support is relatively hard or, more specifically, non-elastic in the substantially vertical direction, in order to be able to represent a precise wheel control. In any event in a design of the second trailing arm as an independent component that is, therefore, separable from the wheel carrier, this desired elastokinematic behavior is achieved in that the support between the support arm and the second trailing arm is disposed relative to the hinge point of the second trailing arm on the wheel carrier. This is done in such a way that the support arm and, thus, also the wheel carrier are pivoted in the substantially horizontal direction under both the influence of lateral forces and also under the influence of braking forces on the wheel, mounted on the wheel carrier, or slightly tilted in such a way relative to the second trailing arm that the wheel (the wheel that is on the outside in a curve when cornering) moves in the toe-in direction. In this context, this support between the support arm and the second trailing arm can be configured in the form of a pendulum support or a rubber bearing exhibiting an elasticity that is suitably different in different directions.

Moreover, it is advisable in terms of a wheel control that is as precise as possible under all boundary conditions, for the possible pivot motion of the wheel carrier or, more specifically, the support arm relative to the second trailing arm, to be defined by a limit stop. Finally, an arrangement of the supporting spring that is provided for the vehicle chassis and that is optimal in terms of both the force and also the necessary design space is disclosed. It is self-evident that other arrangements of the supporting spring are also possible. Moreover, the latter also applies to the arrangement of a damper that is functionally connected in parallel to the supporting spring. The embodiment that is described below and that is used to explain the invention in detail shows one possibility of this arrangement.

Other objects, advantages and novel features of the present invention will become apparent from the following detailed description of one or more preferred embodiments when considered in conjunction with the accompanying drawings.

DETAILED DESCRIPTION OF THE DRAWINGS

A left rear wheel suspension of a passenger vehicle is shown as an exemplary embodiment of the invention in figures. In all of the figures, identical components are marked with the same reference numerals.

In this context a wheel carrier, on which a wheel (not illustrated) is mounted in a rotatable manner about its axis of rotation, bears the reference numeral 1. A first trailing arm 2 is provided in one piece on this wheel carrier 1. Extending from the wheel carrier 1, this first trailing arm is oriented towards the front essentially in the longitudinal direction of the vehicle (or more specifically the direction of travel F). A second trailing arm 3 is connected in an articulated manner to the wheel carrier 1 at a point P1 that is located on the wheel carrier 1 relatively near the wheel. This second trailing arm 3 extends from the wheel carrier 1 essentially in the direction of an angle bisector between the longitudinal direction (F) of the vehicle and the transverse direction (vertical thereto) of the vehicle.

A so-called support arm 4, which is connected in one piece to the wheel carrier 1, and, thus, also extends from the wheel carrier 1, extends substantially parallel to this second trailing arm 3 over a portion thereof. Between this support arm 4 and the first trailing arm 2 a supporting spring 6 is supported on a so-called web portion 5, which is also integrally connected, like the first trailing arm 2 and the support arm 4, to the wheel carrier 1. As a result, the supporting spring 6 represents a component of this one piece "composite" comprising the wheel carrier 1, the first trailing arm 2, the support arm 4 and the web portion 5. Ultimately, this supporting spring supports proportionally the vehicle chassis (not illustrated) on the wheel carried by the wheel carrier 1.

A conventional damper for damping, by way of the supporting spring 6, the possible spring jounce and rebound motion of the vehicle chassis relative to the wheel carrier 1 is marked with the reference numeral 7 and is mounted on the wheel carrier 1 at a suitable place and fastened with its other end on the vehicle chassis.

The free end of the first trailing arm 2 has a receptacle for a trailing arm bearing 2a (not illustrated in detail) preferably in the form of a rubber bearing, by which this first bearing arm 2 is supported directly or indirectly on the vehicle chassis. At each end of the second trailing arm 3 there is a receptacle for a trailing arm bearing 3a or 3b respectively (not illustrated), preferably in the form of a rubber bearing, so that the first end of this second trailing arm 3 is hinged at point P1 on the wheel carrier 1 by means of the trailing arm bearing 3b, and its second end is supported directly or indirectly on the vehicle chassis by means of the trailing arm bearing 3a. Furthermore, in the region between the two ends of the second trailing arm, this second trailing arm 3 has a support 8 for the support arm 4, extending from the wheel carrier 1, or more specifically for its free end. In this case the support 8 is formed by a rubber bearing 9 (cf. FIG. 6), which is pressed into a receptacle 3c provided in the trailing arm 3 for this purpose. This rubber bearing 9 and, thus, its support 8 is and/or are formed significantly softer or more elastically in the substantially horizontal direction than in the substantially vertical direction. Thus, the spring constant C2 of this support 8 or the rubber bearing 9 that acts essentially in the horizontal direction is significantly less than the spring constant C1 of this support 8 or the rubber bearing 9 that acts essentially in the vertical direction (cf. FIG. 6).

Figure 1:
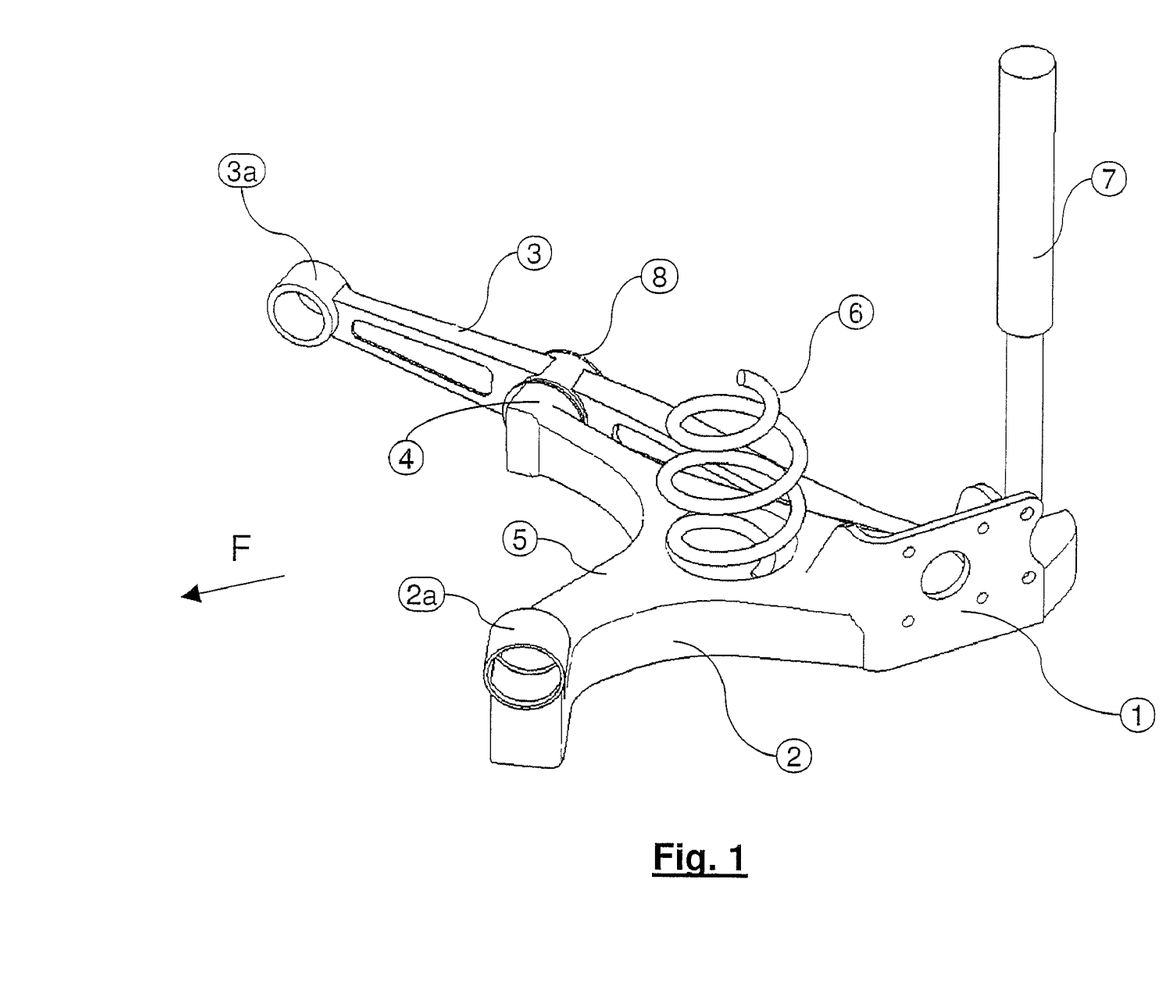
FIG. 1 is a first isometric view from the outside, where the direction of travel is indicated by the arrow F.
Figure 2:
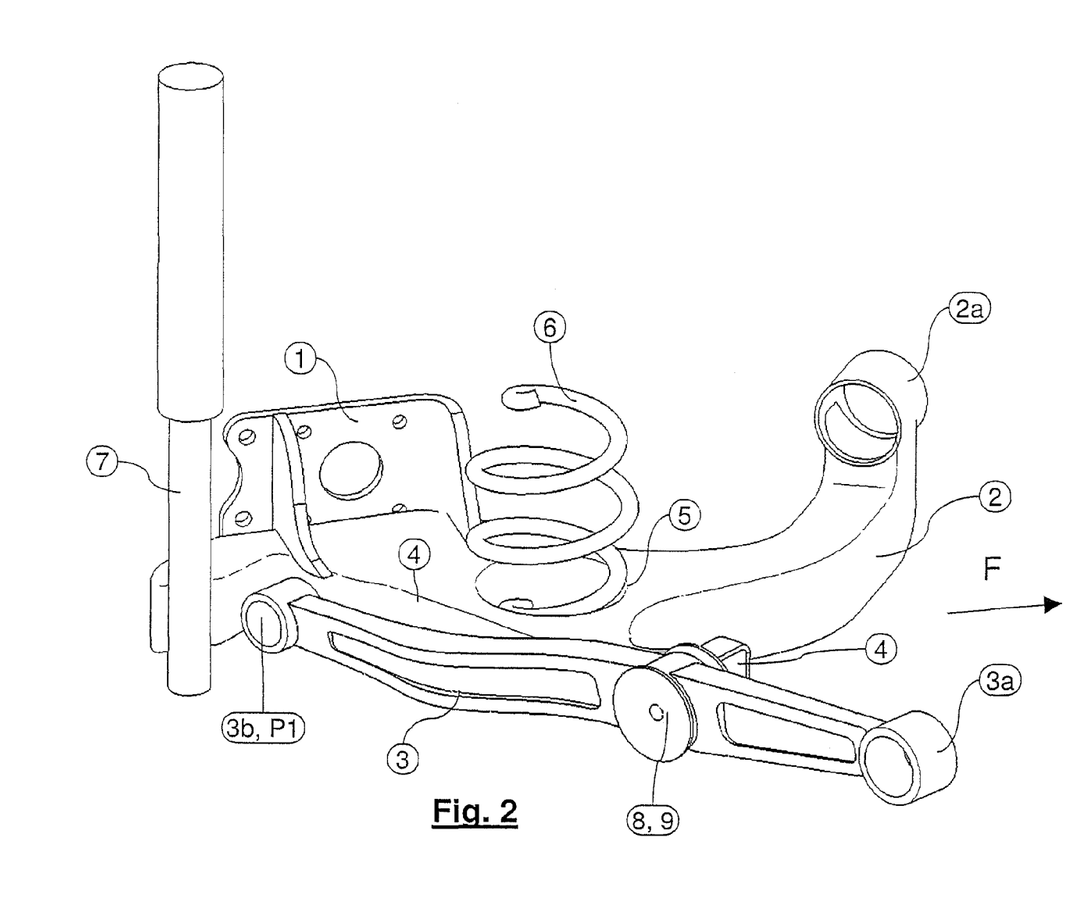
FIG. 2 is a second isometric view from the inside, that is, from the center of the vehicle, and the direction of travel corresponds once more to the arrow F.
Figure 3:
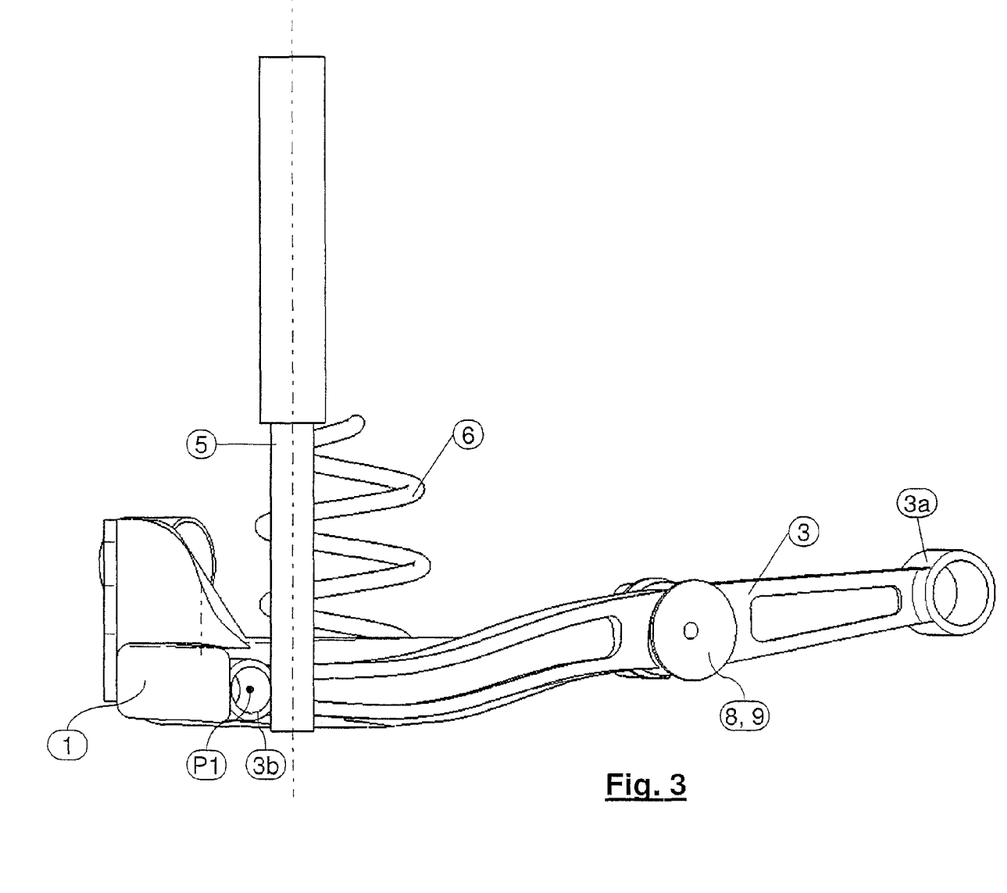
FIG. 3 is a rear view of the wheel suspension from the rear.
Figure 4:
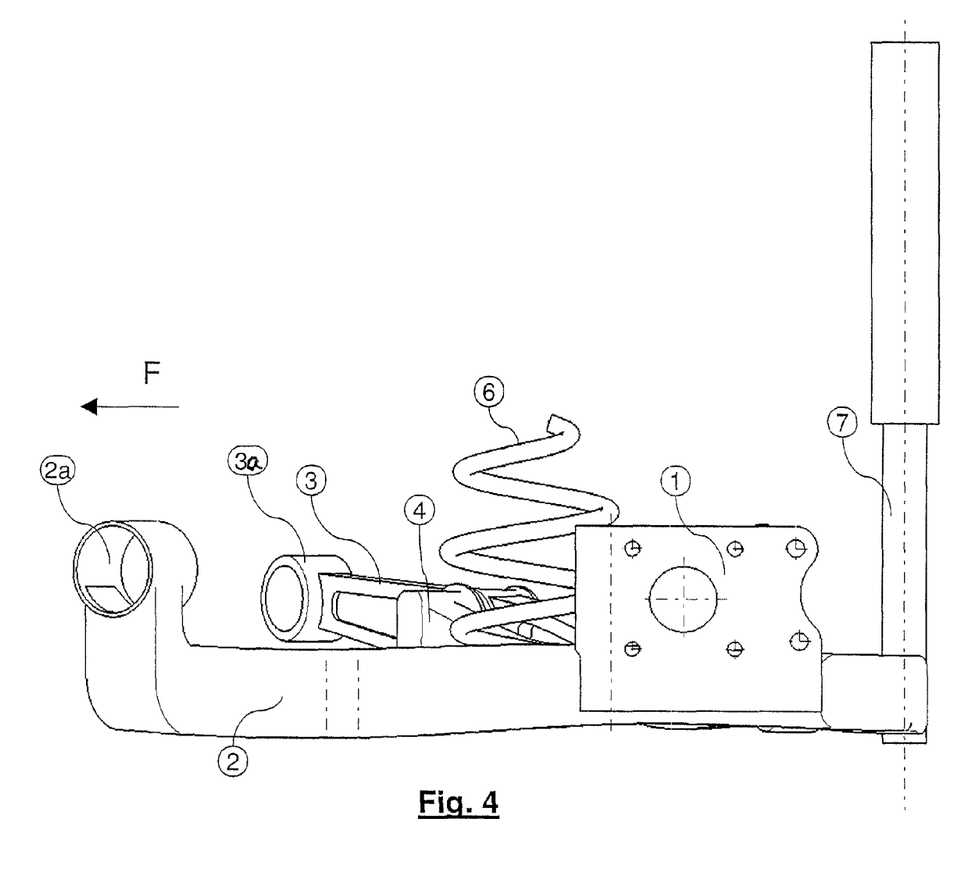
FIG. 4 is a side view from the outside.
Figure 5:
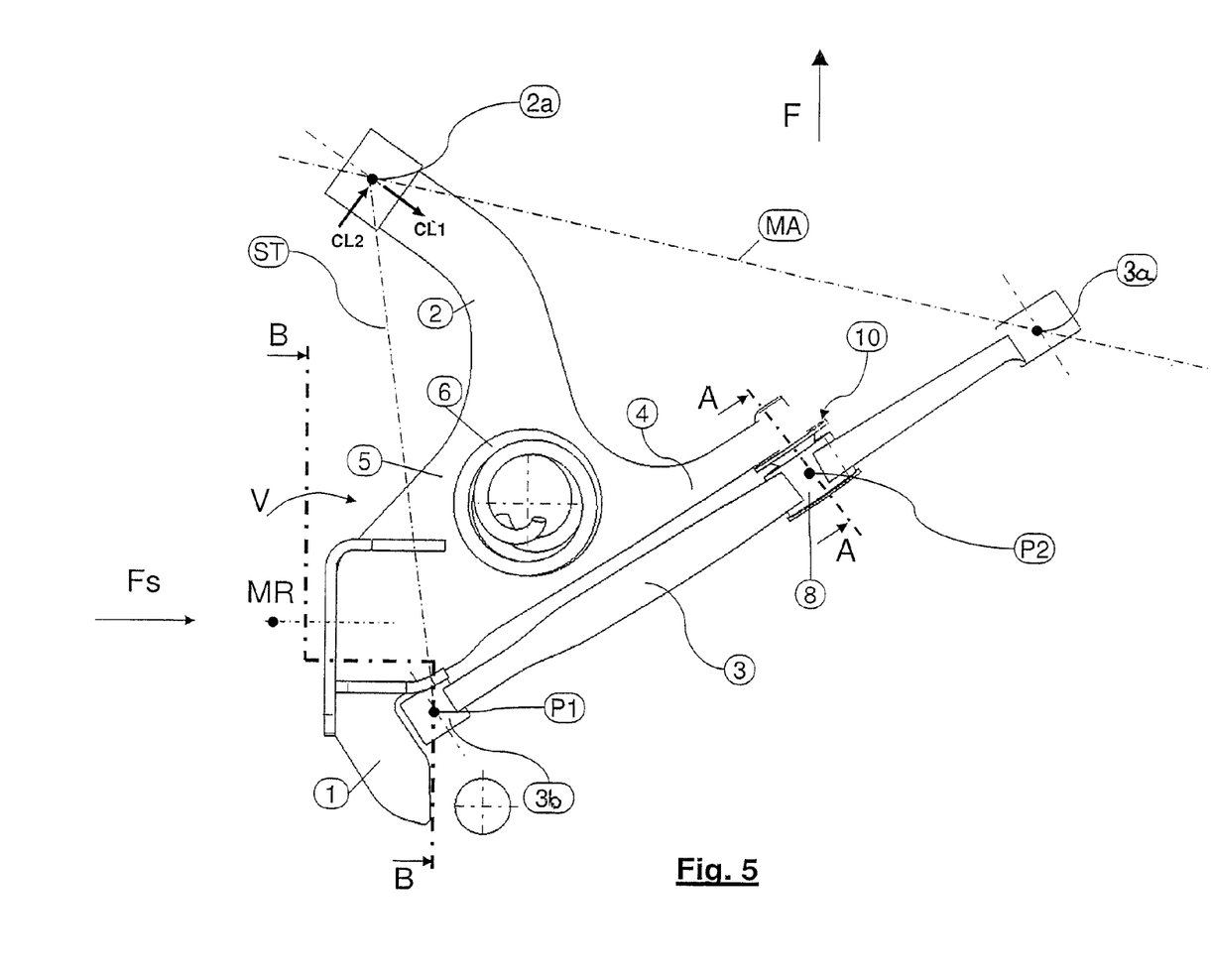
FIG. 5 is a top view from the top onto the wheel suspension.

As in the case of wheel suspensions of the semi-trailer type, the vehicle chassis sided trailing arm bearings 2a and 3a of the first trailing arm 2 and the second trailing arm 3 generate an instantaneous axis MA (cf. FIG. 5) that tilts (slightly) relative to the transverse direction of the vehicle and about which the wheel carrier 1 is pivoted relative to the vehicle chassis under tension or expansion of the supporting spring 6 during the spring jounce or rebound of the vehicle chassis. As in the case of the wheel suspensions according to the prior art mentioned in the introduction, the first trailing arm 2 is provided with a receptacle for the trailing arm bearing 2a in such a way and the rubber bearing or rather trailing arm bearing 2a, which is provided in this receptacle, exhibits different elasticities in mutually perpendicular directions of the horizontal plane such that the wheel that is mounted on the wheel carrier 1 moves in the toe-in direction during a braking action. Analogous to this aforementioned prior art, the spring constant CL1 (cf. FIG. 5) of the trailing arm bearing 2a that acts essentially in the direction of the instantaneous axis MA is significantly less than its spring constant CL2 that acts substantially perpendicular to this instantaneous axis MA and, thus, predominantly in the longitudinal direction of the vehicle, as a result of which there is no automatic correlation between the rigidities of the trailing arm bearing 2a and the instantaneous axis. Such a correlation was made herein only for a rough indication of the orientation of these rigidities.

Figure 7A:
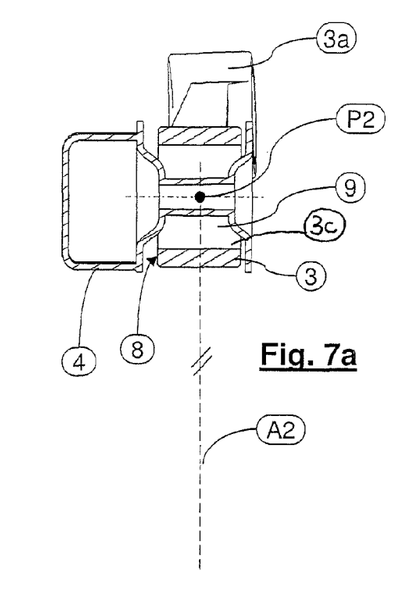
FIG. 7a and FIG. 7b show, once again, the section A-A and the section B-B from FIG. 5 for purposes of elucidating the kinematic relationships.
Figure 7B:
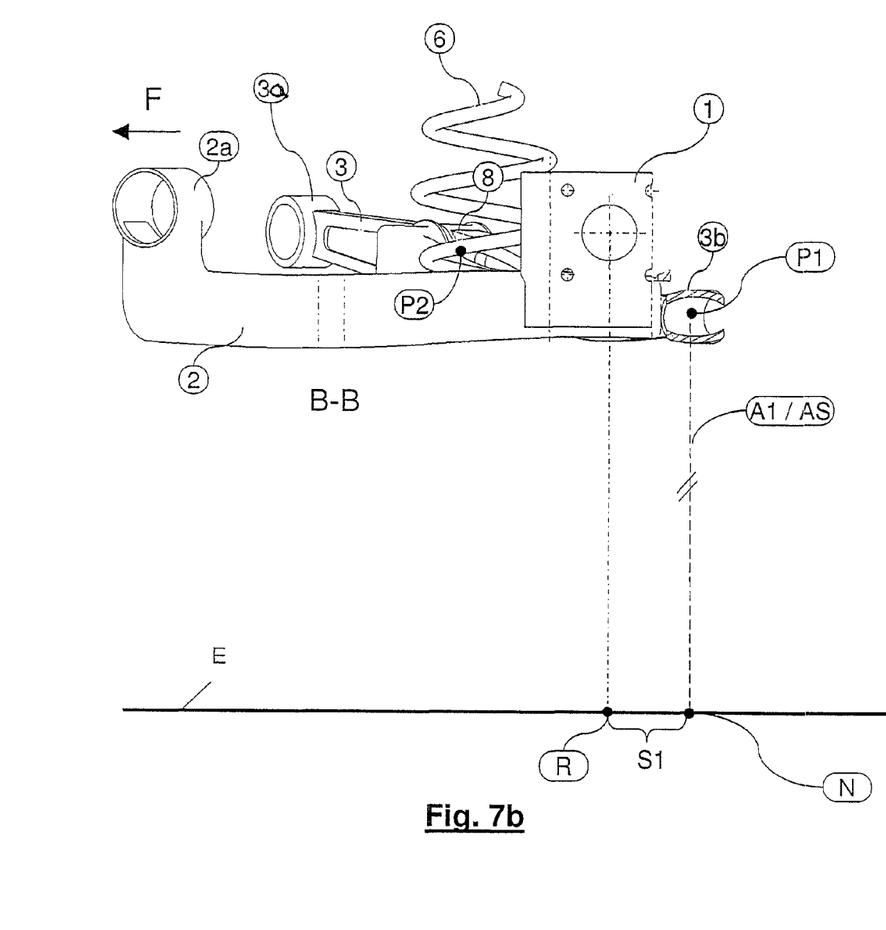

In addition, the support 8, or more specifically in the present case the rubber bearing 9 between the support arm 4 and the second trailing arm 3, is constructed in such a way and is disposed on the wheel carrier 1 relative to the hinge point P1 of the second trailing arm 3 in such a way that the support arm 4 is moved relative to the second trailing arm 3 about the point P1 or more specifically about a so-called toe axis AS (cf. FIG. 7b). This toe axis AS extends substantially or approximately vertically through this point P1. The movement is in the substantially horizontal direction or slightly tilted thereto, according to arrow V (cf. FIG. 5), under both the influence of lateral forces (Fs in FIG. 5) when driving through a curve and also under the influence of braking forces on the wheel, which is mounted on the wheel carrier 1 and whose center point is marked, inter alia, with MR in FIG. 5, so that the wheel carrier 1 and, thus, the wheel is pivoted in the toe-in direction, when it involves the wheel that is on the outside in a curve. In this case the rubber bearing, provided in the receptacle 3b of the second trailing arm 3, is constructed in a relatively rigid manner; as an alternative, it is possible to provide, instead, a ball joint for connecting the second trailing arm 3 in an articulated manner to the wheel carrier 1 at point P1.

Figure 6:
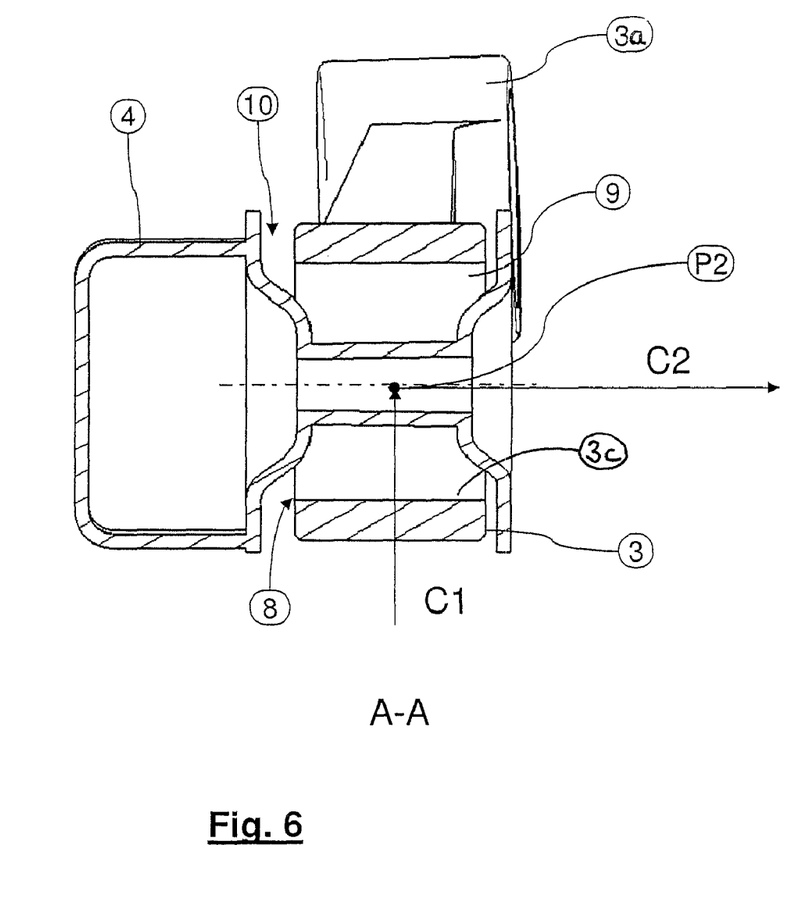
FIG. 6 is a sectional view A-A from FIG. 5.

The possible movement path of the support arm 4 and, thus, the possible pivot path of the wheel carrier 1 relative to the second trailing arm 3 (to achieve the described pivoting of the wheel in the toe-in direction) can be limited by a limit stop or more specifically by a stop 10 in the present case (cf. FIG. 6). For this purpose after a predefined length of travel the support arm 4 comes to rest laterally against the second trailing arm 3.

The corresponding correlations are explained briefly once more by use of FIGS. 7a and 7b. In particular, however, FIGS. 7a, 7b are compared with FIGS. 8a, 8b for the purpose of explaining below an additional "parameter," by which the present wheel suspension can be designed in order to satisfy the respective requirements in terms of its elastokinematic properties. In this case, this additional parameter is not available in the wheel suspensions that are cited as the prior art. Thus, this additional "parameter" constitutes an additional advantage of the inventive wheel suspension over the known prior art and is formed by the installation position or more specifically the tilt of the rubber bearing 9 or rather by the configuration of the support 8 that is active at a point P2 when viewed from a kinematic perspective.

A perpendicular to the road projection of the wheel center point MR on the road E yields the road contact point R of the wheel. According to FIGS. 6 and 7a, the rubber bearing 9 is disposed in the support 8, by which the support arm 4 is supported on the second trailing arm 3 in such a way that the softer support is exactly in the horizontal direction, and the opposing significantly harder support is active along the axis A2 exactly in the vertical direction. Then the intersection point of the axis A1, extending parallel to the axis A2 and through the point P1 in the present embodiment, yields with the road the so-called lateral force neutral point N. If the lateral force, acting on the wheel, were to engage at this lateral force neutral point N, then the wheel would not undergo a toe change under the influence of this lateral force. However, for the investigations of the elastokinematic behavior, the lateral forces engage at the road contact point R of the wheel. In the embodiment according to FIG. 7b, the lateral force neutral point N is now behind the road contact point R of the wheel by an elastokinematic negative caster trail S1, when viewed in the direction of travel F. The result of the lateral forces engaging at the road contact point R of the wheel is a motion or more specifically a slight pivoting of the wheel that is on the outside of a curve about the so-called toe axis AS in the toe-in direction, so that this toe axis AS extends in essence vertically through the lateral force neutral point. In the present figure, the toe axis AS coincides with the axis A1, but it involves a special case, because it is well-known that the course of the toe axis AS is also a function of the configuration of the trailing arm bearing 2a. In this context it is well-known that the camber stiffness is also a factor, but it is not necessary to delve into the details thereof in the present embodiment. Rather, the aforementioned additional "parameter" in the form of the orientation of the axis A2 by suitably designing the support 8 shall be discussed below.

Figure 8A:
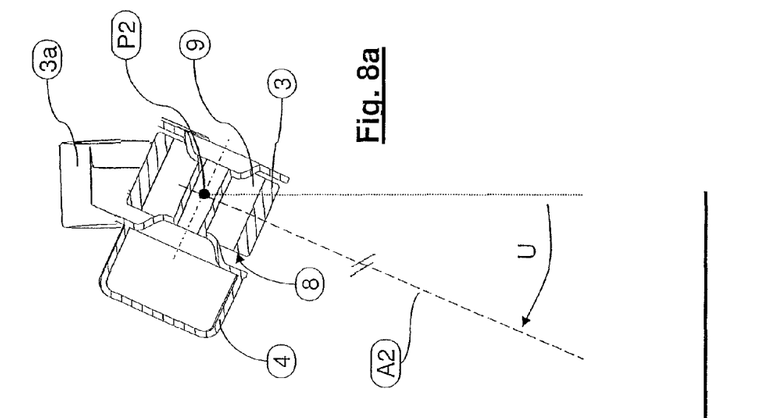
FIG. 8a and FIG. 8b (comparable to FIGS. 7a, 7b) show an alternative embodiment, in which the support of the support arm is rotated clockwise relative to the second trailer by a defined amount.
Figure 8B:
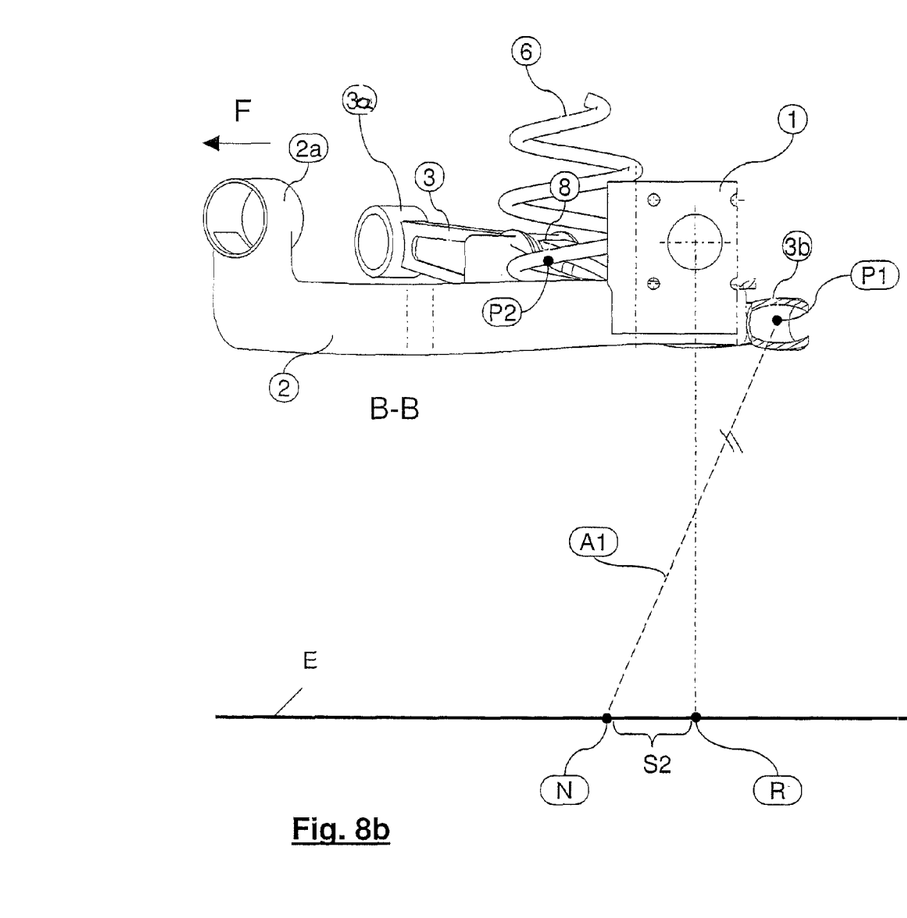

If the rubber bearing 9, by which the support arm 4 is supported on the second trailing arm 3 in the support 8, is arranged, according to the modification according to FIG. 8a, so that the axis A2, defining the substantially harder support, tilts relative to the vertical line and is rotated clockwise by a defined amount with respect to the embodiment in the drawing according to FIG. 7a, then the lateral force neutral point N is located or more specifically "migrates," according to FIG. 8b, (further) towards the front, when viewed in the direction of travel F, because the axes A1 and A2 behave the same with respect to their tilt. In the variant according to FIGS. 8a and 8b, the lateral force neutral point N is located in front of the road contact point R of the wheel by the elastokinematic positive caster trail S2, as a result of which the wheel that is on the outside in a curve moves in the toe-out direction. It is self-evident that it is also possible to have a neutral layout, where the lateral force neutral point N coincides with the road contact point R of the wheel. Therefore, when the rubber bearing 9 or more specifically the support 8 is rotated in the clockwise direction U, according to FIG. 8a, starting from the position according to FIG. 7a, the result is that the lateral force neutral point N tends to move forward, so that, as the angle of rotation increases, the toe of the wheel changes increasingly less under the lateral forces until the lateral force neutral point N and the road contact point R of the wheel coincide. Thereafter as the rubber bearing 9 is further rotated according to the direction of the arrow U, the wheel that is on the outside in a curve moves more and more in the toe-out direction under the influence of the lateral forces. At the same time, rotating the rubber bearing 9 in the direction of the arrow U during a braking action and during a spring jounce, results in an intensified tendency to steer the wheel in the toe-in direction. The reverse behavior results from rotating the rubber bearing 9 counter to the direction of the arrow U in FIG. 8a. Since the lateral force neutral point is also fixed by the position of the point P1 on the wheel carrier 1, at which the second trailing arm 3 is mounted in an articulated manner, it is self-evident that the behavior of the wheel under the influence of the lateral forces can also be defined by suitably fixing the position of the point P1. Furthermore, it must also be pointed out that the axes A1 and A2 are not, or rather do not have to be, parallel in the geometric sense, but rather it is important that their behavior tends to be the same when the axis A2 is rotated in or counter to the direction of the arrow U.

In contrast to the conventional semi-trailer axles, the toe and camber of the wheel can be adjusted in a relatively simple way in the inventive wheel suspension of the vehicle. To this end, the support 8 can have a commensurate adjustment possibility, so that after opening this adjustment possibility the support arm 4 can be moved slightly in relation to the second trailing arm 3. When closing this adjustment possibility, which can be configured, for example, in the well-known way in the form of a bolt, which can be moved transversely to the drill hole axis in a large drill hole, the toe and camber can then be defined. When in the course of such an adjustment, the wheel carrier 1 is tilted about the so-called adjustment axis ST (cf. FIG. 5) that is described by the trailing arm bearings 2a and 3a, in that when the end of the support arm 4 that faces away from the wheel carrier 1 is moved essentially in the vertical direction, the wheel camber is set. Thereafter the wheel toe is adjusted by suitably moving the end of the support arm 4 essentially in the horizontal direction. At the same time the trailing arm bearing 2a has to be released, a state that can be achieved in principle in the conventional way by loosening the associated bearing block (not illustrated).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle wheel suspension of a semi-trailer type, the vehicle wheel suspension comprising:
    a wheel carrier;
    a first trailing arm extending from the wheel carrier in an orientation approximately in a longitudinal direction of the vehicle;
    a second trailing arm extending from the wheel carrier approximately in a direction of an angle bisector between the longitudinal direction of the vehicle and a transverse direction of the vehicle;
    wherein ends of said first and second trailing arms comprise trailing arm bearings by which the trailing arms are supported on a vehicle chassis, said ends determining a substantially horizontal instantaneous axis for the wheel carrier relative to spring jounce and rebound motions of the vehicle chassis;
    wherein the wheel carrier is slightly pivotable about a toe axis in a toe-in direction under the effect of braking forces or side forces when driving through a curve on an outside wheel mounted on the wheel carrier due to an operative configuration of at least one of the trailing arms and an operative elastic configuration of at least one of the trailing arm bearings;
    a support arm securely connected to the wheel carrier, the support arm extending over a defined distance adjacent to and substantially in parallel with the second trailing arm, the support arm being supported on the second trailing arm in an area between a wheel carrier side end of the second trailing arm and a vehicle chassis side end of the second trailing arm via a support;
    wherein the support is operatively configured to be softer in a substantially horizontal direction than in a substantially vertical direction; and
    wherein an operative configuration of at least one of the second trailing arm and the support arm allows a slight pivot motion of the wheel carrier about the toe axis.

2. The vehicle wheel suspension according to claim 1, wherein the operative configuration of the at least one of the second trailing arm and the support arm comprises a configuration of at least one of the second trailing arm and the support arm as a control blade arm, which is rigid in a vertical direction and substantially in a transverse direction of the vehicle, and further which is elastically deformable in a horizontal plane in the longitudinal direction of the vehicle.

3. The vehicle wheel suspension according to claim 2, wherein the support between the support arm and the second trailing arm is one of a pendulum support and an elastic rubber bearing.

4. The vehicle wheel suspension according to claim 1, wherein the second trailing arm is an independent component separable from the wheel carrier; and
    wherein one end of the second trailing arm is coupled in an articulated manner to the wheel carrier in order to represent a toe axis.

5. The vehicle wheel suspension according to claim 4, wherein the support between the support arm and the second trailing arm is one of a pendulum support and an elastic rubber bearing.

6. The vehicle wheel suspension according to claim 5, further comprising a stop operatively configured to limit possible pivot motion of the wheel carrier about the toe axis.

7. The vehicle wheel suspension according to claim 6, wherein the stop defines the possible pivot motion of the support arm relative to the second trailing arm.

8. The vehicle wheel suspension according to claim 7, further comprising:
    a web portion connected in one piece with the wheel carrier, the web portion extending between the first trailing arm and the support arm; and
    a support spring operatively configured to be supported on the web portion, the support spring supporting proportionally the vehicle chassis on the wheel.

9. The vehicle wheel suspension according to claim 1, wherein the support between the support arm and the second trailing arm is one of a pendulum support and an elastic rubber bearing.

10. The vehicle wheel suspension according to claim 1, further comprising a stop operatively configured to limit possible pivot motion of the wheel carrier about the toe axis.

11. The vehicle wheel suspension according to claim 10, wherein the stop defines the possible pivot motion of the support arm relative to the second trailing arm.

12. The vehicle wheel suspension according to claim 1, further comprising:
    a web portion connected in one piece with the wheel carrier, the web portion extending between the first trailing arm and the support arm; and
    a support spring operatively configured to be supported on the web portion, the support spring supporting proportionally the vehicle chassis on the wheel.

* * * * *